United States Patent
Richard et al.

[11] Patent Number: 5,818,634
[45] Date of Patent: Oct. 6, 1998

[54] DUAL MODE OPTICAL MAGNIFIER SYSTEM

[75] Inventors: Fred V. Richard, Scottsdale; Scott R. Novis, Tempe; Karen E. Jachimowicz, Laveen, all of Ariz.

[73] Assignee: Motorola, Inc., Schaumburg, Ill.

[21] Appl. No.: 692,360

[22] Filed: Aug. 5, 1996

[51] Int. Cl.⁶ ............................. G02B 27/44; G09G 3/04
[52] U.S. Cl. .................... 359/565; 359/569; 359/809; 359/823; 345/32
[58] Field of Search .................. 345/32; 359/440, 359/441, 802, 809, 810, 565, 676, 569, 575, 742, 822, 823

[56] References Cited

U.S. PATENT DOCUMENTS

| | | | |
|---|---|---|---|
| 4,991,935 | 2/1991 | Sakurai | 359/802 |
| 5,061,052 | 10/1991 | DeJesus | 359/742 |
| 5,151,823 | 9/1992 | Chen | 359/565 |
| 5,268,790 | 12/1993 | Chen | 359/565 |
| 5,436,763 | 7/1995 | Chen et al. | 359/558 |
| 5,446,588 | 8/1995 | Missig et al. | 359/565 |
| 5,523,890 | 6/1996 | Reaney | 359/802 |
| 5,589,982 | 12/1996 | Faklis et al. | 359/565 |
| 5,633,762 | 5/1997 | Richard | 359/817 |
| 5,644,430 | 7/1997 | Richard et al. | 359/569 |

FOREIGN PATENT DOCUMENTS 0 566 003 10/1993 European Pat. Off. ............... 359/676

*Primary Examiner*—Jon W. Henry
*Assistant Examiner*—John Juba, Jr.
*Attorney, Agent, or Firm*—Eugene A. Parsons

[57] ABSTRACT

A dual mode optical magnifier system (22) including a plurality of multi-order diffractive optical elements (24) having at least one reflective, refractive and conventional diffractive surface formed thereon, that in combination are operable between a low magnification virtual image display mode (26) and a high magnification virtual image display mode (28). The multi-order diffractive optical elements (24) include a plurality of zones defined by $P \times 2\pi$, where P is an integer. The use of multi-order diffractive optical elements (24) enables the elements (24) to be very planar and compact in form so as to be incorporated into portable electronic equipment (40 and 60) such as cellular telephones, pagers, smart card readers (20), computers, or the like, while enabling the desired magnification level to be achieved.

7 Claims, 7 Drawing Sheets

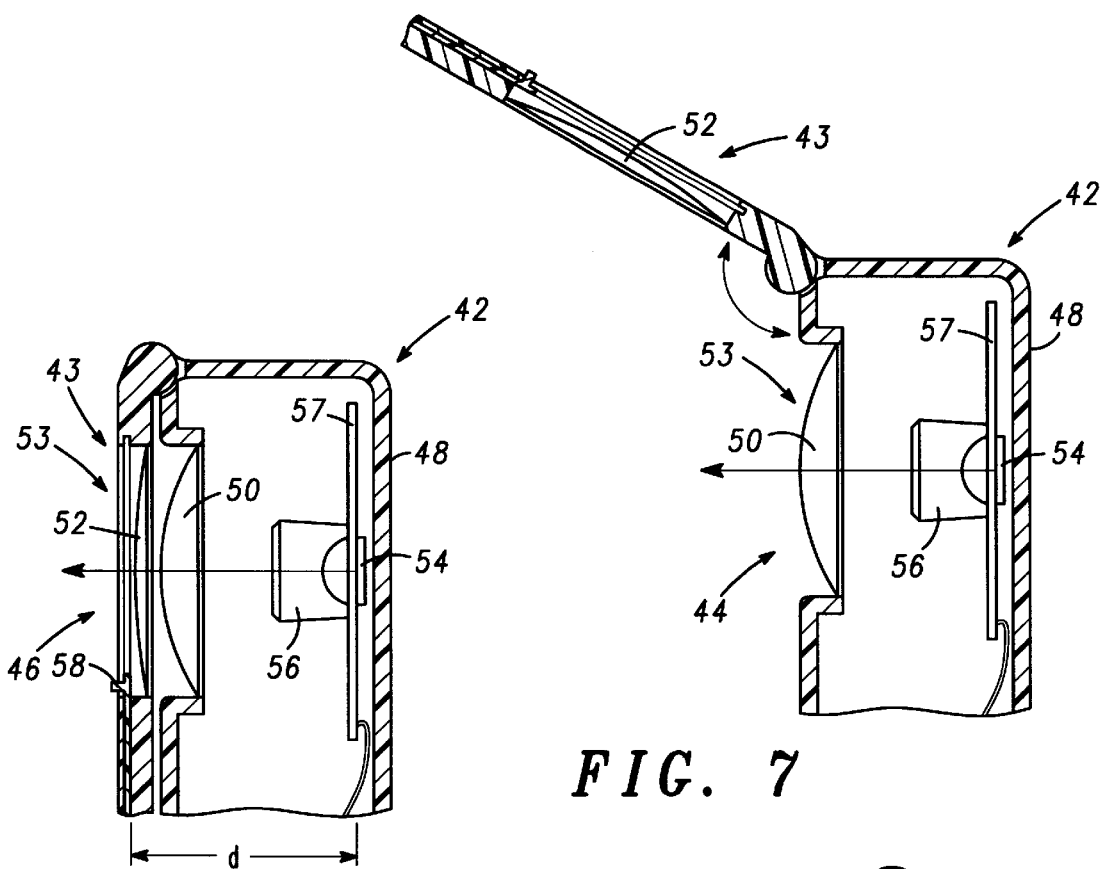
FIG. 7
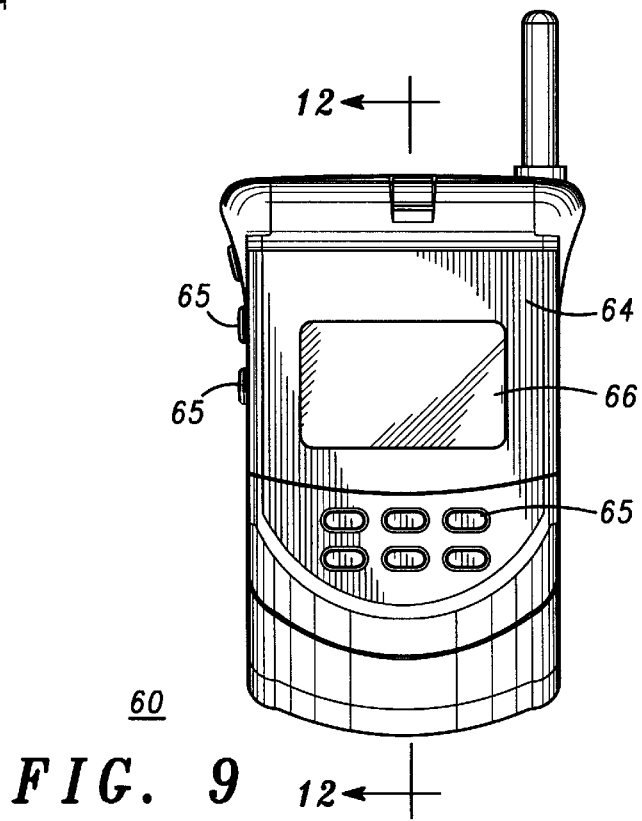
FIG. 8
FIG. 9

DUAL MODE OPTICAL MAGNIFIER SYSTEM

FIELD OF THE INVENTION

The present invention pertains to image manifestation apparatus and more particularly to dual mode optical magnification systems and configurations for use in portable products.

BACKGROUND OF THE INVENTION

With the advent of the communications era, one of the major markets for optical systems and devices is portable electronics equipment, such as cellular telephones, pagers, smart card devices, two-way radios, data banks, computers and the like. Generally, it is desirable that the optical source devices in this type of equipment are compact with low power requirements, inexpensive and include high quality compact optics. Through the use of digital signals which are being transmitted at ever increasing bandwidths, it is possible to transmit increasingly larger and more complex messages to remote portable units. In some instances it is possible to send complete messages, including alpha-numerics and/or graphics by way of novel pagers. Thus, complete messages can be sent to specific recipients by way of a pager, for example.

Also, in many instances it is desirable to provide a visual display on the communication transceiver to supply the operator with an indication of messages received, numbers actually dialed, and other minor but critical information. The problem is that the visual displays on prior art portable electronics equipment are extremely limited in size and require relatively high electrical power as well as a great amount of area to be sufficiently large to magnify and produce a useful display. Thus, while the present visual displays are generally sufficient for displaying the minor information, they are not capable of displaying large alphanumeric and/or graphic messages, more particularly displaying a high magnification virtual image.

The system that is normally used at the present time is one using a large image source and a direct view display or one using a small image source, high magnification optics and a high magnification virtual image display. The major problem with a direct view system is that it greatly limits the size of the portable electronics on which it is used. Basically, the image must be large enough for an operator to read and/or understand the information being displayed. Thus, for example, if one wanted to display an 8.5" by 11" sheet of paper (a standard letter), the direct view display must be 8.5" by 11" to be easily read. Such a display is clearly too large to be incorporated into most portable communications devices, such as pagers, smart card devices, two-way radios, cellular telephones, and the like.

In the prior art, for example, it is common to provide visual displays utilizing liquid crystal displays, directly viewed light emitting devices, etc. These produce very large and cumbersome displays that greatly increase the size of the transceiver and require relatively large amounts of power. Further, such displays, when used on portable products, such as pagers, or the like, greatly limit the amount and, in many instances, the type of messages that can be received.

In typical designs of optical systems, including optical magnifiers, the elements composing the optical system have surfaces with significant curvatures, or short radii, to achieve the desired magnification levels. In addition, in that the apertures of these elements must be big enough to see a wide angle image, these curvatures make the elements very thick, thus not amenable to incorporation in compact portable products. One approach to creating magnifier designs whose elements are very thin is to make use of multi-order diffractive (MOD) surfaces on the optical elements, in addition to reflective, refractive and conventional diffractive surfaces. When utilizing multi-order diffractive optical elements, the phase functions corresponding to the surface are sliced at intervals of P×2π in phase instead of 2π as with the typical diffractive lenses, where P is a design parameter, typically P>2. This allows the lenses to be very compact and thin in design, thus capable of being utilized in compact portable products, while still performing the same function as a typical diffractive lens of greater thickness. In addition, these multi-order diffractive optical elements may include surfaces of reasonably arbitrary curvature and asphericity.

Thus, there is a need for an improved dual mode optical magnifier system which can substantially reduce the required thickness of the optical elements which make up the lens system necessary to achieve a low magnification virtual image display. The reduced element thicknesses would allow the optical system to be collapsed into a very compact idle mode thickness when not in use.

Accordingly, it is a purpose of the present invention to provide for new and improved dual mode optical magnifier systems which allow for the display of a low density virtual image when operated in a low magnification virtual image display mode and a high density virtual image display when operated in a high magnification virtual image display mode, while maintaining minimal thickness of the optical elements.

It is another purpose of the present invention to provide new and improved dual mode optical magnifier systems in which the apparatus is operational in either a low magnification virtual image display mode or in a high magnification virtual image display mode by simply aligning and/or configuring the appropriate optical magnifying elements.

It is a further purpose of the present invention to provide new and improved dual mode optical magnifier systems which are compactly packaged, compactly stored when not in use, and operational by the user in either a low magnification virtual image display mode or a high magnification virtual image display mode.

It is yet another purpose of the present invention to provide new and improved dual mode optical magnifier systems including a low magnification virtual image display mode and a high magnification virtual image display mode which are relatively easy and inexpensive to fabricate.

It is still another purpose of the present invention to provide new and improved dual mode optical magnifier systems operational by the user to receive either a low magnification virtual image display or a high magnification virtual image display which are fabricated so as to be easily incorporated into portable electronic equipment.

It is another purpose of the present invention to provide new and improved portable electronics equipment with dual mode optical magnifier systems, including adjustable optical elements, allowing the user to view the transmitted image in either a low magnification virtual image display mode or a high magnification virtual image display mode, dependent upon the density of the generated image.

SUMMARY OF THE INVENTION

The above problems and others are at least partially solved and the above purposes and others are realized in a dual mode optical magnifier system for use in portable products which utilizes multi-order diffractive (MOD) surfaces, in addition to reflective, refractive and conventional diffractive surfaces, to form the magnifying optical elements of the lens system. The deep and broad diffractive zones of the multi-order diffractive surfaces reduces the element thickness typically required for diffractive lenses which utilize a design parameter of P=1. More specifically, disclosed is the use of a plurality of multi-order diffractive surfaces which utilize stepped phase gratings which are defined by slicing the corresponding phase function at intervals of P×2π in phase, instead of 2π, where P is a design parameter, typically P>2. This utilization of multi-order diffractive optical elements enables the desired magnification level to be achieved while maintaining an optical magnifier system whose elements are dimensionally thin so as to be incorporated into portable products such as cellular telephones, pagers, smart card readers, computers, or the like.

The optical magnifier system of the present invention is intended for incorporation in an electro-optic package for use in portable electronics equipment. More specifically, there is included within the electro-optic package, or as a part of the disclosed optical magnifier system, an image generation apparatus for providing at least one image, drivers and electronic circuitry, and additional optical elements.

In its low magnification virtual image display mode, the optical magnifier system has a plurality of multi-order diffractive optical elements, each further including reflective, refractive and/or conventional diffractive surfaces formed thereon, positioned between the input and the output so as to direct light from the input to the output to create a high magnification virtual image display. In high magnification virtual image display mode, the optical magnifier system has a plurality of multi-order diffractive optical elements, each further including reflective, refractive and/or conventional diffractive surfaces formed thereon, positioned between the input and the output so as to direct light from the input to the output to create a high magnification virtual image display.

BRIEF DESCRIPTION OF THE DRAWINGS

Referring to the drawings:

FIGS. 7 and 8 are simplified sectional views taken through lines 7—7 of FIG. 5 and line 8—8 of FIG. 6;

FIGS. 9 and 10 are simplified schematic views of another portable electronic device incorporating the dual mode optical magnifier system of the present invention;

DESCRIPTION OF THE PREFERRED EMBODIMENTS

Figure 1:
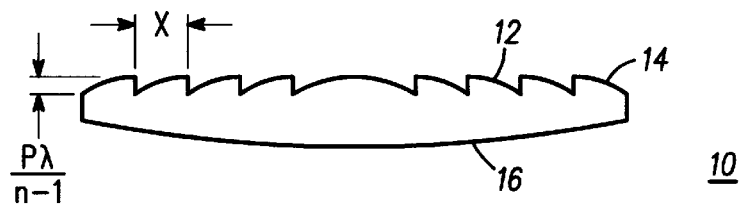
FIG. 1 is a simplified sectional view of a multi-order diffractive optical element according to the present invention.

Referring specifically to FIG. 1, illustrated is a multi-order diffractive (MOD) optical element according to the present invention. Multi-order diffractive optical element 10 includes stepped phase gratings 12 on at least one surface 14. More specifically, optical element 10 is fabricated so that the phase function that element 10 is designed to implement is "cut" at intervals of P×2π in phase, where P is a design parameter, more particularly an integer, instead of being "cut" at intervals of 2π, as is the conventional diffractive optical element. More particularly, in the case of a conventional diffractive lens, where P=1, the lens is broken up into annular zones of varying widths such that light passing through adjacent zones will experience a shift in phase equal to 2π. This means that the light from adjacent zones will remain "in phase" after passing through the diffractive surface. In addition, the zone depth of the multi-order diffractive surface 14 of optical element 10 is characterized by Pλ/n−1, where P is an integer, λ is the design wavelength and n is the refractive index. With a conventional diffractive optical element, wavefronts of light coming from a point on a display, incident on the diffractive surface of the optical element, will be broken up in such a way that after passing through the structure, the wavefront will be, ideally, seamlessly reconstructed. In comparison, multi-order diffractive optical elements utilize zones that are much deeper and broader than the conventional diffractive optical element.

By designing a multi-order diffractive optical structure, such as optical element 10, with P>1 (typically P being on the order of 10), allows for several discrete wavelengths, that satisfy the condition that the wavefronts for those wavelengths be seamlessly reconstructed after passing through the multi-order diffractive optical structure. These wavelengths also come to a focus at a common image plane. This allows for the design of compact optics, in that the multi-order diffractive surfaces can collapse down to a thin, planar surface, that can simultaneously correct for more than one discrete wavelength. In addition, multi-order diffractive optical elements, such as optical element 10, offer the potential, if designed correctly, to produce compact designs that will operate well for "full color" displays, more particularly, discrete, narrow band red, green and blue pixels, or two color red and green pixels.

The thickness of each multi-order diffractive element 10 is generally determined by the rigidity required to maintain a desired shape. As illustrated in FIG. 1, multi-order diffractive optical element 10 is generally of a thickness on the order of 1.0–1.5 mm, thereby capable of being utilized in portable products, such as smart card devices, pagers, cellular telephones, or similar portable electronic equipment, (some of which are described herein) without dimensionally expanding the product due to the necessity of including a thick optical magnifier system. Multi-order diffractive optical element 10 has formed relatively broad diffractive zone widths, referenced in FIG. 1 as "x", thereby permitting broad-band imaging. Optical element 10 is further disclosed as having an opposed surface 16 having formed thereon, at least one of an aspheric and/or conventional reflective, refractive or diffractive surface to allow for further chromatic and other aberration correction. It should be understood that the multi-order diffractive surface 14, more particularly stepped phase gratings 12 could be formed on either side, or both sides of optical element 10.

Figure 2:
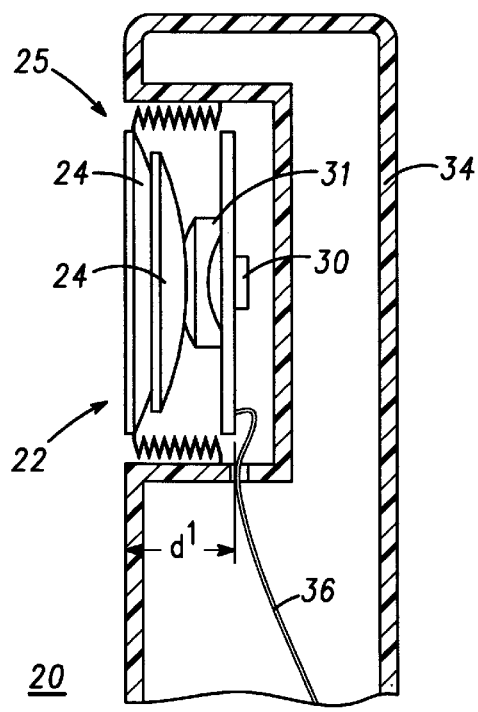
FIGS. 2–4 are simplified schematic views of a dual mode optical magnifier system of the present invention included within a smart card device, with the system thereof being in an idle or stored position, a low magnification virtual image display position and a high magnification virtual image display position, respectively.
Figure 3:
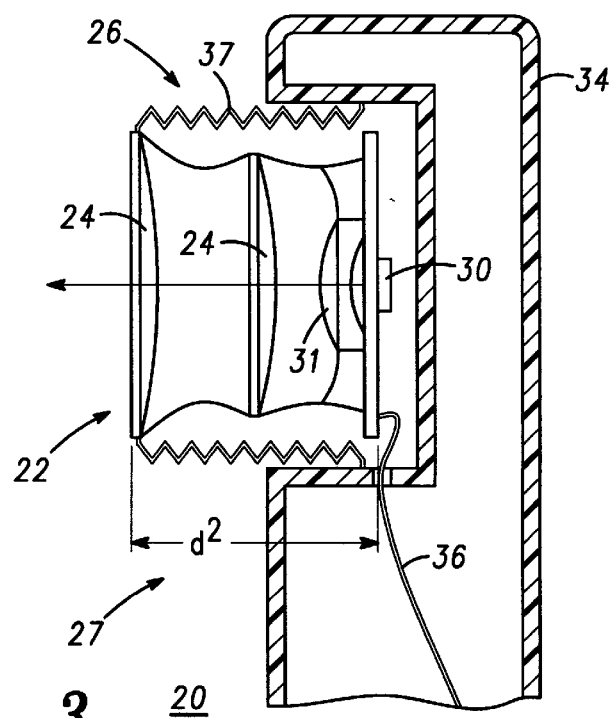
Figure 4:
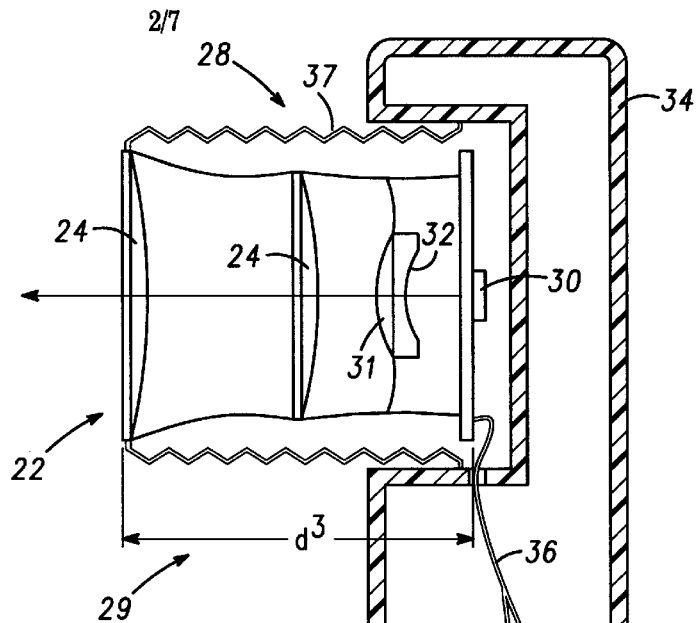
Figure 6:
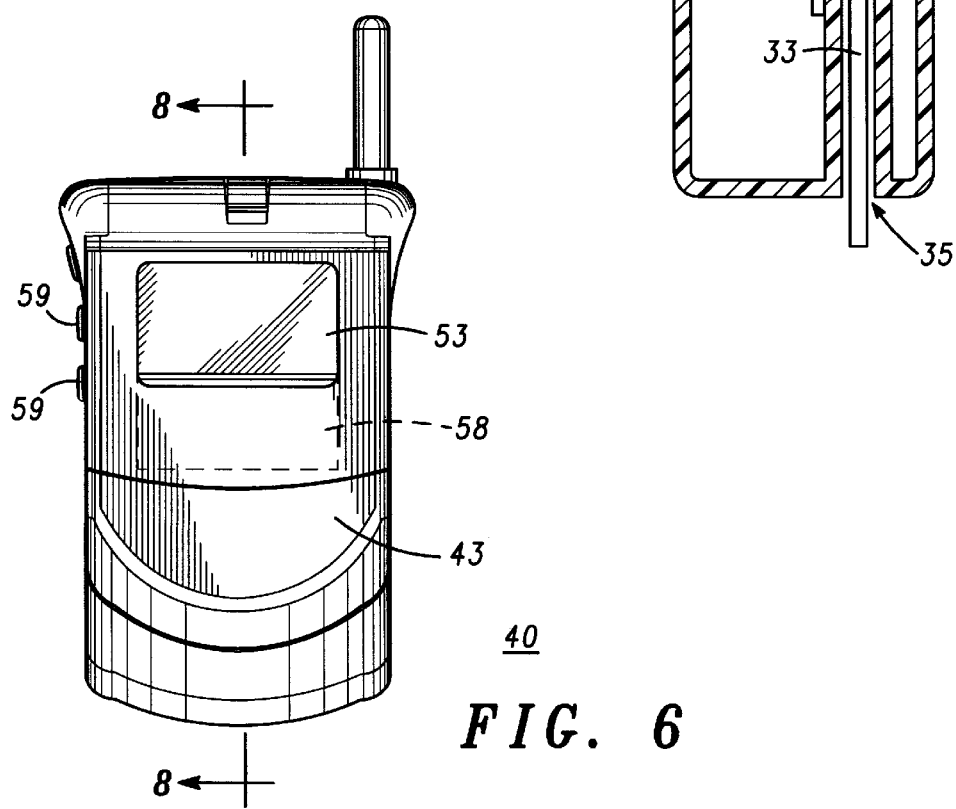
FIGS. 5 and 6 are simplified schematic views of a portable electronic device incorporating a dual mode optical magnifier system of the present invention.

Referring now to FIGS. 2, 3 and 4, simplified schematic views generally illustrating an embodiment of smart card reader device, having included therein a dual mode optical magnifier system, constructed in accordance with the present invention and designated 20, are illustrated. Smart card reader device 20 includes a first embodiment of a dual mode optical magnifier system, generally referenced as 22, composed of a plurality of combined multi-order diffractive optical elements, including at least one reflective, refractive and/or conventional diffractive surface formed thereon, hereinafter generally referenced as 24, each generally similar to optical element 10, previously described with reference to FIG. 1. Optical magnifier system 22 is constructed for positioning in a very compact "idle" or non-use mode or position 25, illustrated in FIG. 2, a low magnification virtual image display mode 26, or a quasi-direct view image display mode, illustrated in FIG. 3, and a high magnification virtual image display mode 28, illustrated in FIG. 4. While idle "mode" or position 25 is referenced and described herein, for purposes of this explanation it will be understood by those skilled in the art that dual mode optical magnifier system 22 essentially has a first mode 27 of operation and a second mode 29 of operation, more specifically low magnification virtual image display mode 26 and a high magnification virtual image display mode 28, illustrated in FIGS. 3 and 4 respectively. It should further be understood that optical magnifier system 22 as illustrated in FIGS. 2–4 is exaggerated, for purposes of this disclosure, with regard to the actual dimensional deployment and alignment of the plurality of multi-order diffractive optical elements 24.

Optical magnifier system 22, as stated is formed of a plurality of multi-order diffractive optical elements 24, including at least one reflective, refractive and/or conventional diffractive surface, that in combination are deployable, thus operable between low magnification virtual image display mode 26 as illustrated in FIG. 3, and high magnification virtual image display mode 28 as illustrated in FIG. 4. In addition, there is provided additional optical elements 31, of which at least one has formed therein a field flattening concave surface 32, which may also be aspheric to compensate for aberration. The major purpose of field flattening concave surface 32 is to provide a flat image plane.

In this particular embodiment, the plurality of multi-order diffractive optical elements 24 are deployable, spatially from an image source 30. As a means of reference, when in an "idle" or stored position 25, optical magnifier system 22 in this specific embodiment collapses down to a dimension, referenced here as $d^1$, of approximately 6.5 mm from an outermost surface of optical element 24 to an emission surface of image source 30. When optical magnifier system 22 is deployed in low magnification virtual image display mode 26, having an approximate magnification strength of 4.2×, the dimension, referenced here as $d^2$, from an outermost surface of optical element 24 to the emission surface of image source 30 is approximately 18.6 mm. When optical magnifier system 22 is deployed in high magnification virtual image display mode 28, having an approximate magnification strength of 16×, the dimension, referenced here as $d^3$, from an outermost surface of optical element 24 to the emission surface of image source 30 is approximately 24.4 mm. It should be understood that the above described dimensional specifics are for illustrative purposes only, and that dimensional variations are intended to be included within this disclosure. More particularly, low magnification virtual image display mode 26 is intended to magnify a received image less than approximately 10× and high magnification virtual image display mode 28 is intended to magnify a received image more than 10×.

As stated, optical magnifier system 22 is intended for incorporation into portable electronics equipment. Accordingly, optical magnifier system 22 is illustrated as specifically incorporated into smart card reader device 20, capable of reading and displaying information stored on a smart card 33. Generally, a smart card can be defined as a card containing a semiconductor chip with some electronics and a memory for storing information. Typically, smart cards are used to store personal information, ranging from medical information to financial data. It is thus desirable to provide for a portable electronic device that incorporates a means for reading information stored on the smart card to determine informational status. The smart card reader device 20 as disclosed is capable of aiding in the reading of this type of information by incorporating dual mode optical magnifier system 22 as disclosed. More particularly, dual mode optical magnifier system 22 allows for the reading of information as either a low magnification virtual image display or a high magnification virtual image display dependent upon the mode of operation (as previously described).

As illustrated, smart card reader 20 includes a portable housing 34 which is ergonomically designed to be handheld, that is housing 34 is formed to conveniently fit the hand and allow comfortable use of a plurality of controls (not shown) to operate the device. Housing 34 also includes a slot 35 for receiving smart card 33 therein and allowing the sensing of information stored on smart card 33. Slot 35 is designed to place smart card 33 adjacent to a sensing structure 38 mounted in housing 34 in data sensing juxtaposition. It will of course be understood that while slot 35 is preferable for correctly positioning smart card 33, other structures might be utilized, including simply placing smart card 33 adjacent to a sensing structure that is externally accessible.

Housing 34 has mounted therein dual mode optical magnifier system 22 for providing a visual image of the information stored on smart card 33. Electronics (not shown) and electronic interconnects 36 are mounted in housing 34 in electrical communication with the sensing structure, image generation apparatus 30, and dual mode optical magnifier system 22. During operation between a low magnification virtual image display mode 26 and a high magnification virtual image display mode 28, there is provided a means for switching image generation apparatus 30 from generating a low density display to a high density display. As illustrated, optical magnifier system 22 is supported and enclosed within an expandable housing 37, thereby permitting the dimensionally spatial deployment of optical elements 24 and 31, while serving to protect elements 24, 30 and 31 from dust, moisture, etc.

Referring now to FIGS. 5–8, disclosed is a second embodiment of the optical magnifier system of the present invention. Illustrated in FIGS. 5–8 is a portable electronic device 40, such as a pager, cellular telephone, portable telephone, smart card device, or the like, including a base component 42 and a flippable cover 43. Base component 42 has viewable on an uppermost surface an aperture 51 for viewing a low magnification virtual image display, while cover 43, when positioned in a closed positioned has viewable on an uppermost surface an aperture 53 for viewing a high magnification virtual image display. Thus, portable electronic device 40 is operable in dual modes, more specifically a low magnification virtual image display mode 44 and a high magnification virtual image display mode 46, dependent upon the positioning of cover 43, relative to base component 42, in an open or closed position.

Figure 5:
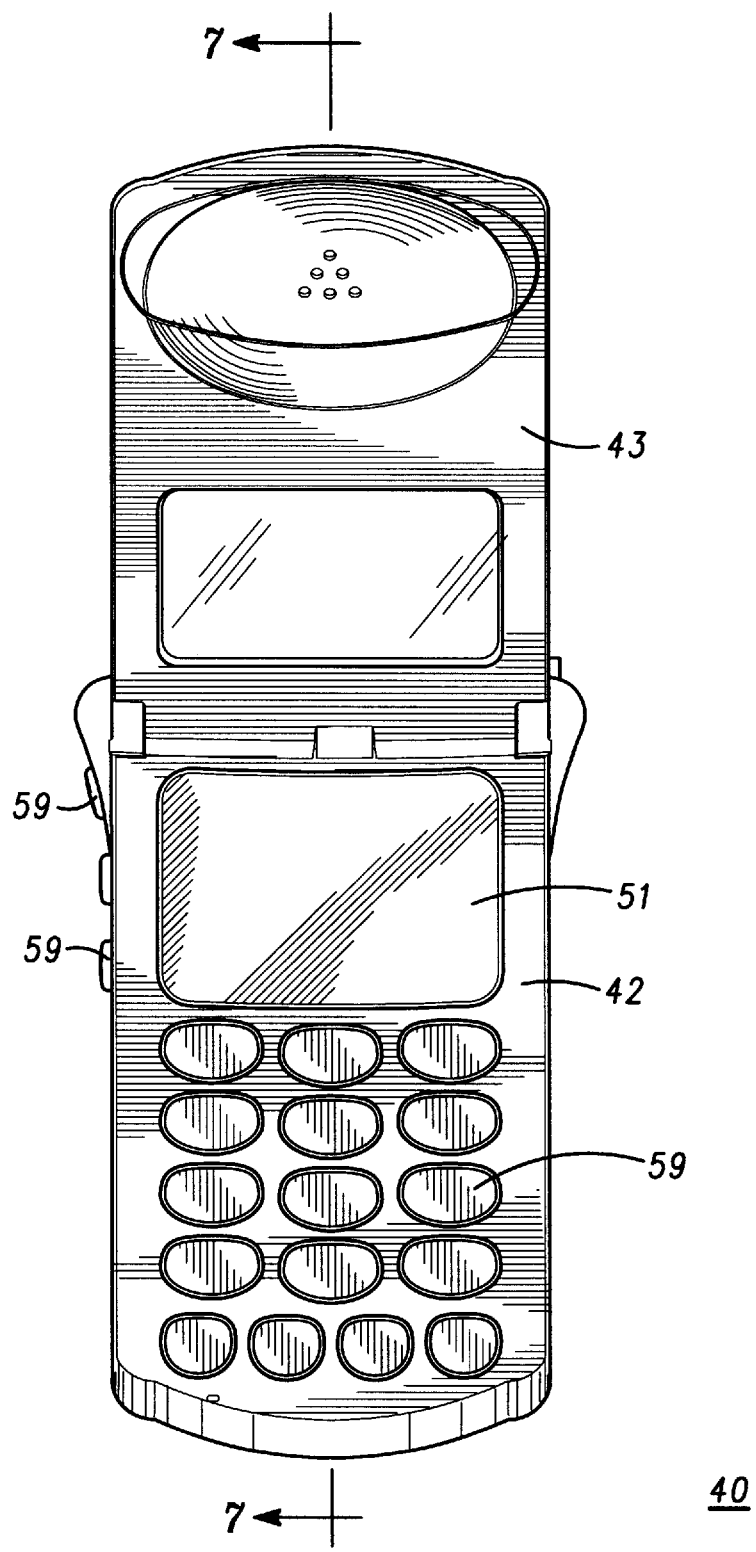

Illustrated in sectional views in FIGS. 7 and 8, are base component 42 including a housing 48 having disposed therein at least one multi-order diffractive optical element 50, including at least one reflective, refractive and/or conventional diffractive surface, generally similar to multi-order diffractive optical element 10, previously described with regard to FIG. 1, thus enabling optical element 50 to be fabricated substantially compact and thin in form. Cover 43 is hingeably attached to housing 48 and has included therein at least one additional multi-order diffractive optical element 52, generally similar to multi-order diffractive optical element 10, previously described. During operation, when portable electronic equipment 40 is positioned so that cover 43 is in an open position, as illustrated in FIGS. 5 and 7, the image as seen through aperture 51, formed by optical element 50, is viewable by the observer as low magnification virtual image display 44. When portable electronic equipment 40 is positioned so that cover 43 is in a closed position, thereby aligning optical elements 50 and 52, the image as seen through aperture 53, formed by optical element 52, is viewable by the observer as high magnification virtual image display 46. More specifically, optical elements 50 and 52 are fabricated to align and/or "stack" when cover 43 is positioned in a closed position, so that an image, generated by an image generation apparatus 54 is viewable therethrough as a high magnification virtual image display 46. As illustrated in FIG. 8, in that optical elements 50 and 52 are multi-order diffractive optical elements, the dimension, referenced as "d", from an outermost surface of optical element 52 to an emission surface of image source 54 is minimal, and in this specific embodiment is approximately 21.7 mm. Due to the compact dimensions of portable electronic equipment 40, optical elements 50 and 52 must be extremely thin.

There is provided a lens system 56. Lens system 56 is disclosed as comprised of a plurality of convex/concave surfaces. The major purpose of lens system 56 is to provide a flat image plane and to this end lens system 56 includes a field flattening concave surface, which may also be aspheric to compensate for aberration. Lens system 56 may be formed directly in, or as a portion of, the upper surface of a mounting structure 57. It will be understood, however, that lens system 56 is illustrated as a separate component in this embodiment.

There is optionally provided, a filtering element (not shown), or the like, formed and/or positioned on an outermost surface of optical elements 50 and/or 52. This filtering element serves to protect optical elements 50 and 52 from abrasions, or the like, and additionally serves as a filter for ambient light. Additionally, there is provided a plurality of user interface controls 59 (discussed presently) and a slideably adjustable protective cover 58, thereby providing additional protection for optical element 52 when portable electronic equipment 40 is not operational.

Figure 10:
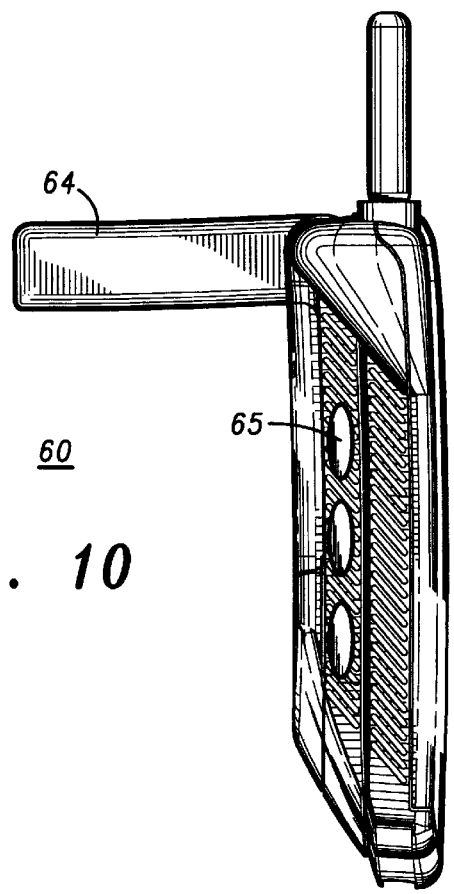
Figure 11:
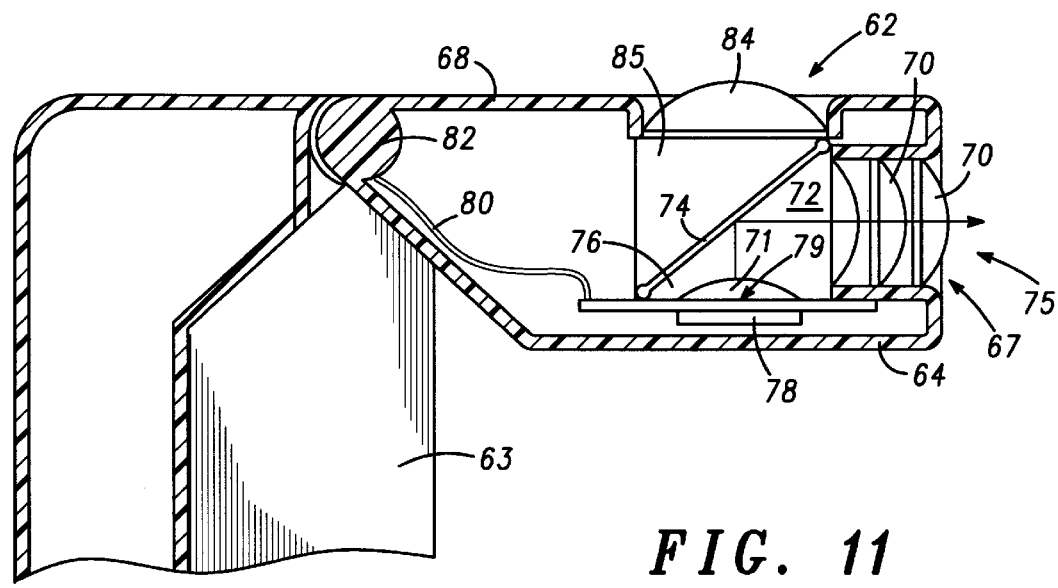
FIG. 11 is a simplified cross-sectional view of the device of FIG. 10 illustrating the high magnification virtual image display mode.

Referring now to FIGS. 9–12, illustrated is an embodiment of a portable electronic equipment, designated 60, incorporating therein a dual mode optical magnifier system 62 of the present invention. More specifically, illustrated in FIG. 9 is a view of the outermost front surface of portable electronic equipment 60. Portable electronic equipment 60 has formed therein a hingedly moveable optical module 64, housing dual mode optical magnifier system 62. Portable electronic equipment 60 is capable of operation in dual modes, dependent upon the rotational, thus optical, alignment of the optical magnifier system 62, which incorporates the multi-order diffractive optical elements (discussed presently) housed therein, thus the positioning of optical module 64 relative to a base component 63. As illustrated in FIG. 10, hingedly moveable optical module 64 is positioned in a "swing out" or high magnification virtual image display mode 75, thus a high magnification virtual image display is viewable through an aperture 67 (as illustrated in FIG. 11). There is provided an electronic and/or mechanical switching device (not shown) that responds to the positioning of moveable optical module 64, thus generating an image as a low density virtual image or a high density virtual image. Base component 63 has included therein a plurality of user interface controls 65 (similar to user interface controls 59 of FIGS. 5 and 6), thereby allowing interfacing between the user and the image generated within the displays. User interface controls 65 include such features as an on/off switch, cursor controls for controlling a cursor in the virtual image, and controls for any electronic devices connected thereto.

Referring specifically to FIG. 11, illustrated is a simplified cross-sectional view as seen through optical module 64 of FIG. 10. As illustrated, moveable optical module 64 is positioned in high magnification virtual image display mode 75. Moveable optical module 64 includes a housing 68 and a plurality of refractive and/or conventional diffractive surfaced optical elements 70 positioned in optical alignment. It should be understood that dependent upon design parameters, optical elements 70 could alternatively contain multi-order diffractive surfaces, generally similar to optical element 10 of FIG. 1. In addition, there is provided a plurality of prism optical elements 72 and 85, element 72 having a field flattening concave surface 71 (generally similar to field flattening concave surface 32 of FIGS. 2–4) formed therein and element 85 having a multi-order diffractive optical surface defined on an uppermost surface. There is provided a compliant membrane, or prism contact layer, 74 positioned on a hypotenuse of prism element 72, and having an air gap 76 positioned therebetween. During operation in high magnification virtual image display mode 75, an image generation apparatus 78, generates a high density image. Optical prism element 72 is positioned between an optical input 79 and a light output, or aperture 67 of optical magnifier system 62. During operation total internal reflection is achieved due to air gap 76 and thus light is directed from input 79 to the output to create a virtual image display. The plurality of optical elements 70 are positioned adjacent the light output so as to receive the reflected light. The plurality of optical elements 70, 71, and 72, present when viewing the image in high magnification virtual image display mode 75, define a light path from a path input to a path output as further illustrated by the directional arrow in FIG. 11, thereby permitting viewing of the display by an eye of a user. The plurality of optical elements are constructed to angularly magnify the generated image in an amount greater than ten.

As illustrated, there is additionally provided electrical interconnects 80 for interfacing optical module 64 with base component 63. Optical module 64 is mounted to base component 63 with a rotational hinge mount 82, thereby allowing for the "swing out" of optical module 64 when utilizing the high magnification virtual image display mode.

Figure 12:
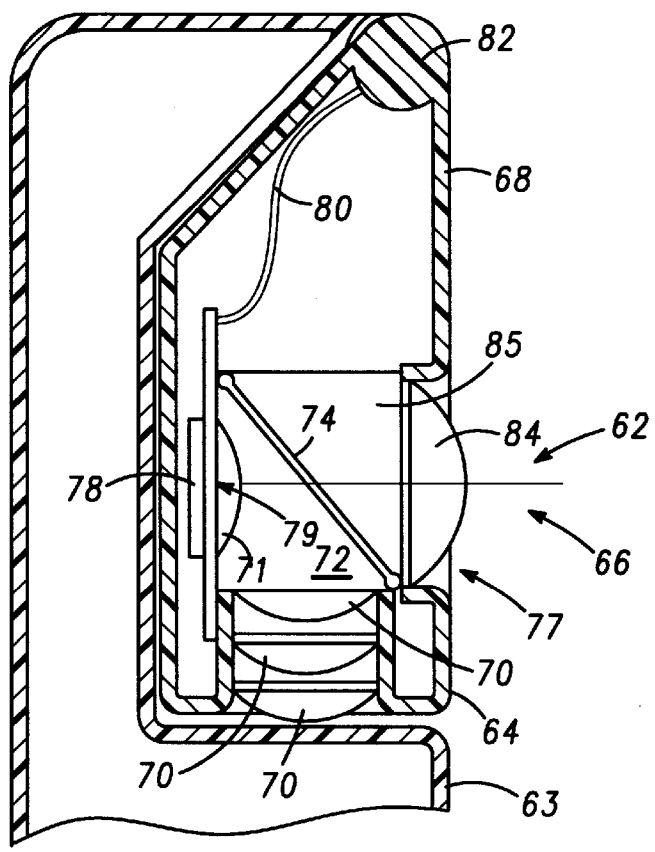
FIG. 12 is a simplified sectional view taken through line 12—12 of FIG. 9 illustrating the low magnification virtual image display mode.

Referring now to FIG. 12, illustrated is optical module 64 positioned in a "closed" or normal position, thereby allowing the user to view the generated image through an aperture 66 in a low magnification virtual image display mode 77. Optical module 64 in addition to the elements described with regard to FIG. 11, includes a multi-order diffractive optical element 84, generally similar to multi-order diffractive optical element 10 previously described with reference to FIG. 1. During operation, a switching device (not shown) reacting to the normal positioning of optical module 64, moves compliant membrane or prism contact layer 74 to rest upon the hypotenuse of prism element 72, thereby directing the light generated by image generation apparatus 78 in a straight line, as illustrated by the directional arrow, through optical elements 85 and 84. Alternatively, to facilitate switching between a low magnification mode and a high magnification mode, prism contact layer 74 would be fabricated as a polarizing beam splitter (not shown). Thus, low and high magnification modes would be selected by switching the polarization of the light emitted from image source 78.

It is additionally disclosed to fabricate an optical magnifier system including a plurality of multi-order diffractive optical elements which are slideably mounted on a mounting structure, over the generated image area so as to allow proper rotational positioning of a desired high magnification virtual image display system or a low magnification virtual image display system, dependent on the mode of operation. The movement of the optical system to the proper position, in turn slideably and rotationally moves the individual multi-order diffractive optical elements, aligning either a high magnification or low magnification optical system over the generated image.

It should be understood that the above mentioned switching device includes a feature incorporated into drive electronics so that when moveable positioning of the dual mode optical magnifier system as disclosed in the above embodiments takes place, a signal is submitted to a controller (discussed presently) to change the display characters from a low resolution, large font, quasi-direct or low magnification virtual image to a high resolution, high information content, virtual image and vice versa dependent on the positioning of the optical system.

The image generation apparatus (30, 54 and 78) disclosed in the previous embodiments is constructed to generate a low density image or a high density image viewable by the eye of an observer in either a low magnification virtual image display or a high magnification virtual image display, dependent upon the mode of operation. As illustrated in the disclosed embodiments, the image generation apparatus is affixed in overlying relationship to a mounting structure having the optical magnifier system of the disclosed embodiments positioned in overlying optical alignment, thereto. The image generation apparatus (30, 54, 78) of the disclosed embodiments is disclosed as including a support structure comprised of a thin glass plate having a circuit pattern formed therein, including a semiconductor chip having a large array of light emitting devices formed thereon. Additional information on this type of electro-optical package is available in U.S. Pat. No. 5,432,358 entitled "INTEGRATED ELECTRO-OPTICAL PACKAGE", issued Jul. 11, 1995, which discloses an integrated electro-optical package including a semiconductor chip having a major surface with an array of light emitting devices formed on the major surface at a central portion thereof and cooperating to generate a complete image.

It should be understood that because of the much smaller size of the low magnification virtual image, the amount of magnification required is much smaller, i.e. less than approximately 10x. In addition, because the low magnification virtual image is viewed at a larger distance from the eye, typically 225 mm, more power is required to generate this image, compensating for the effects of ambient light. Also, because the low magnification virtual image is smaller, any message contained in the low magnification virtual image must be larger in order to be perceived by the operator. In contrast, the high magnification virtual image display is viewed at a shorter distance from the eye, typically 35 mm with a magnification greater than 10x. Thus, whereas one LED in an array of light emitting devices of the image generation apparatus produces one pixel in a final high magnification virtual image (for example), several LEDs in the array may operate in conjunction to produce one pixel (typically 4 actual pixels) in the low magnification virtual image. This feature can be incorporated into the drive electronics and could be automatically switched or energized when the operator moves the dual mode optical magnifier system from a low magnification mode to a high magnification mode. Because several LEDs produce one pixel, in many instances the higher power requirement may be automatically resolved. If additional power is required in some applications, drive current to the LED array can also be automatically increased in the low magnification virtual image display mode.

Figure 13:
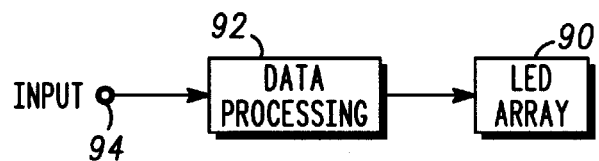
FIG. 13 is a simplified block diagram of electronics associated with the image generation apparatus of FIGS. 2–12.
Figure 14:
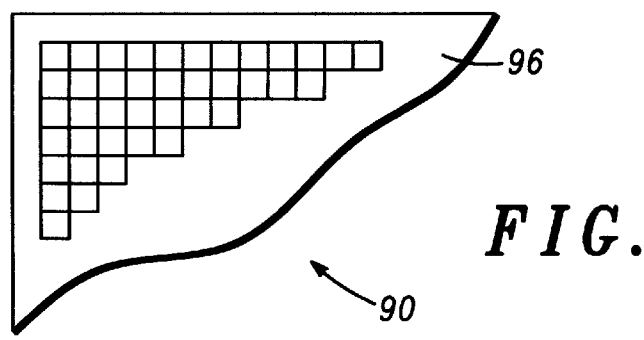
FIG. 14 is an enlarged view in top plan of an LED array, portions thereof broken away, forming a portion of the image generation apparatus of FIGS. 2–12.

The image generation apparatus as disclosed in the above-described preferred embodiments is illustrated in more detail in FIGS. 13 and 14 and includes, for example semiconductor electronics such as a two-dimensional light emitting device (LED) array 90 driven by data processing circuits 92. The array 90 of LEDs can include any of the well known light emitting devices, such as but not limited to light emitting devices (organic or inorganic), electroluminescent devices, vacuum field emission devices, vertical cavity surface emitting lasers, etc. The data processing circuits 92 include, for example, logic and switching circuit arrays for controlling each LED in the LED array. The data processing circuits 92 may include, in addition to or instead of the logic and switching arrays, a microprocessor or similar circuitry for processing input signals 94 to produce a desired real image on a device such as the LED array 90. It will be understood that the data processing circuits 92 and the LED array 90, while illustrated separately for purposes of this description, could be formed on the same semiconductor chip in some applications.

In this specific embodiment the LED array 90 is utilized because of the extremely small size that can be achieved and because of the simplicity of construction and operation. It will of course be understood that other image generating devices may be utilized, including but not limited to lasers, LCDs, FEDs, etc.

Referring specifically to FIG. 14, a plan view of LED array 90 is illustrated in which the LEDs are formed in a regular, addressable pattern of rows and columns on a single substrate or semiconductor chip 96. Portions of chip 96 are broken away to simplify the drawing, but it should be understood that many of the other circuits could be included on the same chip. By addressing specific LEDs by row and column in a well known manner, the specific LEDs are energized to produce an image. Digital or analog data is received at an input terminal 94 and converted by data processing circuits 92 into signals capable of energizing selected LEDs to generate the predetermined real image.

It will be understood by those skilled in the art that the image generation apparatus as illustrated in the disclosed embodiments is actually much smaller. Generally, a substrate, e.g. a semiconductor chip 96, carrying the LED array 90 ranges from approximately 2 centimeters on each side to 1 millimeter on each side and, in a preferred embodiment of the present invention, the size of the array ranges from 1.0 centimeter on a side to 0.1 centimeters on a side. Further, each light emitting device or pixel ranges in size approximately from 50.0 microns to 0.25 microns on a side having a preferred range from 20.0 microns to 0.5 microns. It should be understood that the actual light emitting device array is much smaller, because bonding pads, etc. add several millimeters of area on each side. Generally, the larger size substrates simply mean that more light emitting devices are used in the array to provide more definition, color, etc.

Alternative, electro-optical packages are anticipated by this disclosure such as those disclosed in U.S. Pat. No. 5,543,958 entitled "AN INTEGRATED ELECTRO-OPTIC PACKAGE FOR REFLECTIVE SPATIAL LIGHT MODULATORS", filed Dec. 21, 1994, and assigned to the same assignee and U.S. Pat. No. 5,467,215 entitled "AN INTEGRATED ELECTRO-OPTIC PACKAGE FOR REFLECTIVE SPATIAL LIGHT MODULATORS", filed Dec. 21, 1994, and assigned to the same assignee. Specifically, disclosed are electro-optical packages incorporating a reflective liquid crystal spatial light modulator (LCSLM) stack and a molded optically clear mounting support. Disclosed are the use of one or more light sources positioned on a lower surface of the mounting support or in the alternative embedded within an optical waveguide formed by the provided mounting support. As disclosed, the light sources can include a single light emitting device (LED) or several LEDs positioned so as to substantially uniformly illuminate the spatial modulator stack. The preferred embodiments is disclosed as comprised of three LEDs (a red, a green and a blue LED) in an optically clear support which are alternately activated to form three different light sources, each of which fully and uniformly illuminates the spatial modulator stack at different times. By activating each LCSLM (pixel) in accordance with the amount of each color (red, green, or blue) required in each pixel during the time that color LED is activated, a complete and full color image is produced for each cycle of the three LEDs. More than one LED of each color can be utilized if more than one is required to provide full and uniform illumination. It should be understood that a similar full color display could be used which employs a transmissive liquid crystal spatial light modulator.

The light sources may be embedded in the optically clear support during the molding process and a patterned transparent conductive layer, patterned electrical leads, or imbedded electrical leads are provided on the lower surface of the support to provide electrical connections to the light sources.

A housing, formed of optically clear material, is provided with a plurality of external leads molded into the housing so as to extend into the housing and electrically engage the external terminal ends of the leads and to extend outwardly beyond the outer surface of the housing and form mounting and/or external electrical connections for the integrated electro-optic package. The housing is formed to receive a diffuser therein, which forms an image plane for light emitted from the stack. It will be understood that diffuser and/or additional optical elements can be mounted in the lower cavity by threaded engagement or by any other convenient means, such as "snap-in" or frictional engagement.

Figure 15:
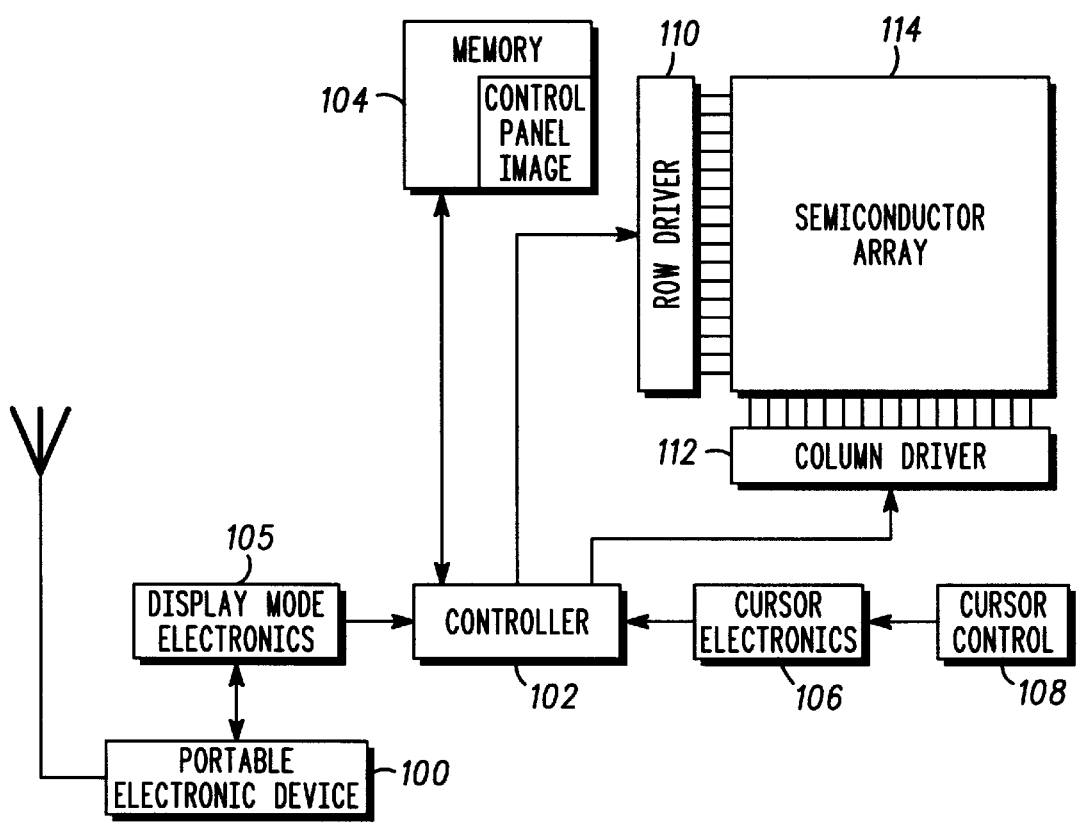
FIG. 15 is a block diagram of electronics for portable electronic equipment embodying the dual mode optical magnifier system of the present invention.

Referring specifically to FIG. 15, a block diagram of electronics for portable electronic equipment or other devices embodying the dual mode optical magnifier system of the present invention is illustrated. A portable electronic device 100, generally similar to smart card reader 20, and portable electronic equipment 40 and 60, can be any of the well known portable electronic devices, such as a cellular or cordless telephone, a portable telephone, a two-way radio, a pager, a smart card device, etc. Device 100 has a data output connected to a controller 102 which may be a microprocessor, a DSP, a gate array, specially designed logic circuits, etc. A memory 104 is connected to a controller 102 and stores information and messages, graphic and/or alphanumeric, received by device 100 in accordance with the programming of controller 102. Display mode electronics 105 are connected to an input of controller 102, for submitting signals regarding the specific mode of operation to controller 102. Cursor electronics 106, driven by cursor controls 108, is also connected to an input or inputs of controller 102. In the alternative, cursor electronics 106 could be integrated into the controller 102.

Controller 102 receives video data from memory 104 and cursor electronics 106 and supplies the video data to row and column drivers 110 and 112 respectively, which in turn activate specific light generating devices in a semiconductor array 114 to produce the desired picture or frame of information. In addition, controller 102 adjusts the video display from a low frequency/low density quasi-direct or low magnification virtual image to a high frequency/high density high magnification virtual image, dependent upon the signal submitted from the display mode electronics 105 to controller 102 when the optical magnifier system of the present invention is aligned and/or re-aligned thereby changing modes from a low magnification virtual image display mode to a high magnification virtual image display mode, or vice versa. In a specific example, timing signals are supplied to row drivers 110 to supply an activating potential to each complete row, one at a time, and in a periodic sequence from the first row at the top to the last row at the bottom. Simultaneously, a complete row (or column) of video data is placed in column drivers 112 (or row drivers 110), which generally include a latching function, and the data is supplied to the row of devices receiving the activating potential from the row drivers 110. When the second row is activated by row drivers 110, a new row of data is switched into array 114 from column drivers 112. In this fashion, a complete image is generated with the definition and quality depending upon the number of devices included in array 114. Generally, it is desirable to include in the range of 50 to 1500 pixels by 50 to 1500 pixels with each pixel including at least one light emitting device, for purposes of color and/or redundancy.

The rational for dual mode optics is the need to have both a high resolution visual display for high information content information exchange, such as images, long messages, graphical/iconic user interface designs, etc. and a low resolution visual display for simple function/device interaction, such as entering a pin number, a phone number, or reading simple information like a date and time stamp, or balance information. The requirement is the need to cope with more information while at the same time not giving up an ounce of convenience or portability. The disclosed dual mode optical magnifier system caters to both requirements. One mode favors quick, simple, convenient use while the other is designed for more in-depth high information exchange, both capable of maintaining portability and low power consumption.

Thus, optical magnifier systems, incorporating a plurality of multi-order diffractive optical elements are disclosed. Each of the multi-order diffractive optical elements are fabricated having broad and deep zones, and capable of being collapsed into a substantially compact planar optical element. The optical magnifier system is operational in either a low magnification virtual image display mode or a high magnification virtual image display mode dependent upon the alignment of the multi-order optical elements and the image generated by an image generation apparatus. More specifically, the elements are deployable, rotationally aligned, and/or in stacked alignment dependent upon the desired mode of operation.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A dual mode optical magnifier system comprising:

a plurality of multi-order diffractive optical elements, including at least one of a reflective, refractive, or single-order diffractive surface formed thereon, in combination, operable between a low magnification virtual image display mode and a high magnification virtual image display mode, each of the plurality of multi-order diffractive optical elements having formed on at least one surface thereof, a plurality of stepped phase gratings, defining a plurality of zones dependent on a phase function that each of the plurality of multi-order diffractive optical elements is implementing;

an image generation apparatus for generating each of a low density image and a high density image dependent upon operation between the low magnification virtual image display mode and the high magnification virtual image display mode; and a housing, wherein the plurality of multi-order diffractive optical elements and the image generation apparatus are mounted within the housing and the multi-order diffractive optical elements are adjustable within the housing, so as to operate between the low magnification virtual image display mode and the high magnification virtual image display mode.

2. A dual mode optical magnifier system according to claim 1 wherein the dual mode optical magnifier system is included within a portable electronic device.

3. A dual mode optical magnifier system according to claim 2 wherein the portable electronic device includes at least one of a smart card device, a portable telephone, a cellular telephone, and a pager.

4. A dual mode optical magnifier system according to claim 3 wherein the plurality of multi-order diffractive optical elements are positioned to receive a generated image from an image generation apparatus and provide a magnified image viewable at an aperture as one of a low magnification virtual image and a high magnification virtual image.

5. A dual mode optical magnifier system according to claim 4 wherein the low magnification virtual image display mode magnifies a received image less than approximately 10× and the high magnification virtual image display mode magnifies a received image more than approximately 10×.

6. A dual mode optical magnifier system comprising:

an image generation apparatus, mounted on a mounting structure positioned within a housing, for generating at least one image, the image generation apparatus including a semiconductor chip mounted on the mounting structure, the image generation apparatus further including a two dimensional array of light emitting devices formed on the semiconductor chip and selectively cooperating to generate each of a low density image and a high density image, the light emitting devices being positioned in rows and columns to define all pixels of the image and operably connected to mounting pads adjacent outer edges of the semiconductor chip; and a plurality of multi-order diffractive optical elements positioned within the housing in optical alignment with the image generation apparatus, the plurality of multi-order diffractive optical elements including at least one of a reflective, refractive, or single order diffractive surface formed thereon, in combination the plurality of multi-order diffractive optical elements operable in each of a low magnification virtual image display mode and a high magnification virtual image display mode, each of the plurality of multi-order diffractive optical elements having formed on at least one surface thereof a plurality of stepped phase gratings, defining a plurality of zones on an order of $P \times 2\pi$, the plurality of multi-order diffractive optical elements positioned to receive the generated image at an optical input and provide an enlarged virtual image at an aperture, the plurality of multi-order diffractive optical elements moveably stacked one atop another dependent upon a mode of operation.

7. A dual mode optical magnifier system according to claim 6 further including a switching device capable of submitting a signal to a controller in response to positioning of the plurality of multi-order diffractive optical elements in one of a low magnification virtual image display mode and a high magnification virtual image display mode, the controller thereafter capable of submitting a signal to the image generation apparatus to generate an image as one of a low density image and a high density image.

* * * * *